United States Patent [19]

Brower

[11] Patent Number: 4,747,681

[45] Date of Patent: May 31, 1988

[54] TRACTION STRIP FOR EYEWEAR

[76] Inventor: Arthur B. Brower, P.O. Box 480145, Los Angeles, Calif. 90048

[21] Appl. No.: 735,488

[22] Filed: May 20, 1985

[51] Int. Cl.⁴ .............................................. G01C 5/02
[52] U.S. Cl. .................................. 351/139; 351/138; 351/132; 428/40
[58] Field of Search ............... 351/136, 137, 138, 139, 351/122, 132; 428/40, 355

[56] References Cited

U.S. PATENT DOCUMENTS 3,186,001  5/1965  Roedez ................................. 351/138
4,070,104  1/1978  Rice ................................. 351/139 X

FOREIGN PATENT DOCUMENTS 676559  7/1952  United Kingdom .................. 428/40

Primary Examiner—Rodney B. Bovernick
Attorney, Agent, or Firm—I. Louis Wolk

[57] ABSTRACT

Means, in the form of traction strips for attachment to eyeglasses at the inner surface of the nose bridge and/or to the inner surfaces of temple members which are easily applied and removed and which provide frictional engagement, said strips comprising porous members impregnated or coated on one side with a pressure sensitive adhesive for adherence to such inner surfaces and in which said adhesive tends to penetrate said strips influenced by body heat. Said strips are preferably provided with spaced ribs extending transversely to the direction of slippage. The strips are individually provided with detachable tabs to facilitate easy and sanitary attachment of individual strips. The traction strips with their tabs may be mounted in multiple on a backing.

7 Claims, 1 Drawing Sheet

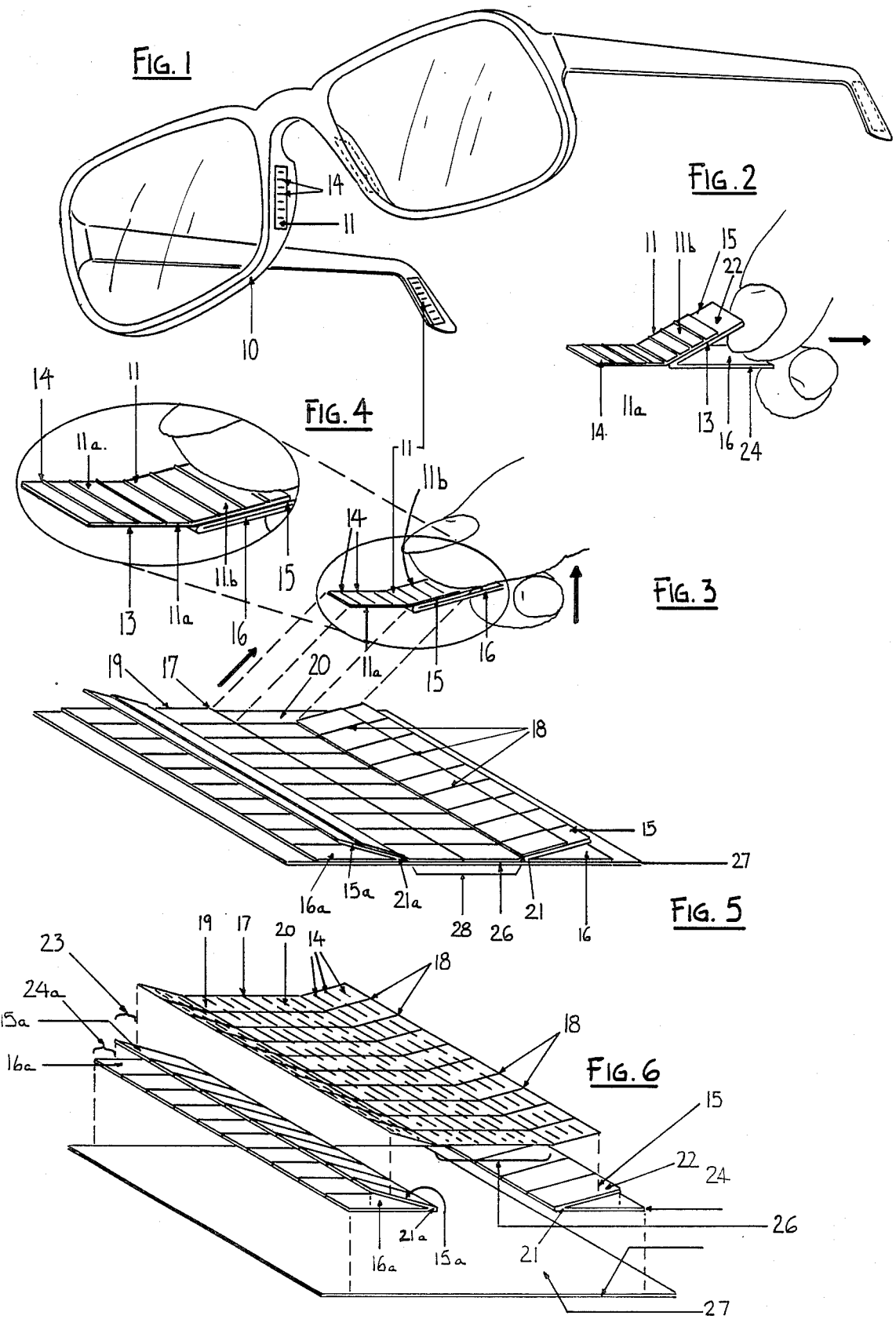

TRACTION STRIP FOR EYEWEAR

BACKGROUND OF THE INVENTION

It is important to maintain eyeglasses in proper position on the nose and at the temples in order to ensure proper alignment of the lens with the eyes and to avoid the discomfort of changes in position during periods of wear. This has been found to be especially important in the case of individuals who wear glasses and who must carry on activities which require precision and close observation for long periods of time, such as in the case of jewelers, watch repairers, assemblers of electronic and computer components and surgeons during operations. This is important as well to many others who are engaged in activities in which slippage of eyeglasses is inconvenient or otherwise undesirable as in the case of public speakers, actors, or those engaged in sports activities. Eyeglass slippage, in general, is inconvenient and undesirable for all individuals who must wear them.

This problem has long been recognized in the prior art in which solutions have been attempted through the use of soft rubber pads, as U.S. Pat. No. 2,216,503 or by the use of sponge rubber pads, or by using adhesives applied directly to the nose pieces or temple members of eyeglasses as in the case of U.S. Pat. No. 4,251,302. In the use of soft rubber or sponge pads, they must be of significant thickness to provide support which results in changing the optimum alignment of the lenses and which also may not provide sufficient frictional resistance to movement after absorbing perspiration. In the case of the directly applied adhesives, these must be periodically removed by the use of solvents and tend to become excessively adherent to the skin and leave deposits thereon and are obviously messy and inconvenient.

SUMMARY OF THE INVENTION

Applicant has discovered that strips of the appropriate size of porous material, i.e. fabric or plastic, or more particularly a non-woven or felted fabric formed of fibers or filaments of plastic material aatted together and lightly bonded when coated or impregnated with a presssure sensitive adhesive can provide highly effective frictional resistance to undesired movement when applied to the nosepiece or temple pieces or other skin contacting areas, and permit satisfactory positioning of the eyeglasses for a desired period of time. As designed, these strips are easily removed and quickly replaced as needed.

More particularly, applicant has discovered that such strips cut from such fabric which are provided with closely spaced parallel fibers or synthetic polymer filaments which are positioned in the strips to extend transversely or angularly to the direction of slippage of the nose or ear piece area of the eyeglasses when the strip described is applied, are most effective in resisting displacement.

In addition, applicant has provided means for providing said strips individually or assembled in multiple, on a backing with the adhesive side protected, and in a manner which will permit removal from the backing and attachment to the skin contacting surfaces without contact of the fingers with the adhesive surface, by the provision of tabs which are grasped for removal from the backing and for application to the eyeglasses in their proper position.

BRIEF DESCRIPTION OF THE DRAWINGS

FIG. 1 is a view in elevation showing a pair of eyeglasses with the traction strips of the invention in place at the nose and ear pieces.

FIG. 2 is an enlarged detail view of a single traction strip prior to application as its protective strip is about to be removed.

FIG. 3 illustrates the removal of a single strip from an assembly.

FIG. 4 illustrates the manner in which a single strip is grasped for application of one end of the strip to an eyeglass.

FIG. 5 is a view in elevation showing the manner of assembly of a plurality of strips after-removal of a single strip as shown in FIG. 3.

FIG. 6 is an exploded view illustrating the manner in which the composite layers of the multiple unit of FIG. 5 have been assembled.

DETAILED DESCRIPTION

As shown in FIG. 1, a pair of eyeglasses 10 is provided with traction strips 11 of the invention mounted upon the nose piece areas and upon the ear pieces. Said strips are positioned to be in engagement with respective areas of the nose and behind the ears when the glasses are worn. When the strips are provided with parallel transverse filaments, 14, as described below, they are attached so that these filaments extend transversely or at least angularly to the normally downward direction of slippage.

FIG. 2 illustrates an individual traction strip, 11, which is in the form of a segment of a fibrous strip 12 preferably cut from a sheet of matted bonded non-woven fibers and provided on its under side with a coating of a pressure sensitive adhesive 13. In order to provide added resistance to slippage, the fibrous sheet from which the strip is cut, and the resulting strip, is provided with spaced parallel filaments, 14, or fibers extending transversely to the longitudinal axis of the strip as shown. In order to permit removal of individual strips from a base sheet protecting the adhesive as described below without touching the adhesive, the strip is provided at its end portion with a folded-over V-shaped segment of a sheet material which provides a pair of tabs or grasping members, as shown at 15 and 16 in FIG. 2, as well as in FIGS. 3 and 4. The V-shaped segment is made of a material to which the adhesive will cling but from which it is readily separable, such as polyethylene or similar plastic, or even waxed paper. This segment is applied in such manner that the upper fold, 15, is adhered over approximately one-half of the adhesive coating of strip, 11, with the other portion of the adhesive coating exposed for initial attachment prior to removal of 15 as described further below. The initial attaching segment of the strip is indicated at 11a.

As shown in FIGS. 5 and 6, a convenient way of making and supplying the traction strips of the invention is to use a sheet of fibrous material provided on one side with a layer of pressure sensitive adhesive in a manner which will provide a desired number of separate segments. As stated above, the fibrous material is a sheet or mat of non-woven fibers, such as, rayon, polyester or other synthetic fibers, or cotton or other natural fibers, lightly bonded together with an adhesive material to form a self-sustaining porous sheet and is then coated on one side with a suitable pressure sensitive adhesive. While the fibrous sheet is preferably formed of non-woven fibers, it may also have a conventional closely woven fibrous structure.

The fibrous sheet, after cutting into multiple separate segments, may then be assembled as a unit upon a backing member as shown in FIGS. 5 and 6.

For example, where it is desired to provide a number of traction strips in two rows upon a backing, a fibrous sheet of the type desired may be cut along longitudinal line 17 and in multiple transversely along lines 18 to provide two rows 19 and 20 of contiguous traction strips. Prior to cutting the fibrous sheet, it is coated on one side with pressure sensitive adhesive, and a pair of folded-over backing strips 21 and 21a of suitable plastic sheet or film are affixed along the respective edge areas of the fibrous sheet with the upper folds 15 and 15a of the strips in contact with the adhesive on the fibrous sheet but with end areas or tab portions projecting or lying free to permit them to be grasped, as shown, for example, at 22 and 23. The bottom or lower segments of the V-shaped folded strips, 16 and 16a are of equal or preferably of greater width to also provide tab ends 24 and 24a, described above with respect to FIGS. 2, 3 and 4. The assembly may then be cut through along lines 17 and 18 to provide two rows of traction strips in which an adhesive coated area corresponding to area 26 remains uncovered. Protection of this uncovered area is then accomplished by placing the cut assembly upon a backing sheet 27, also formed of readily releaseable material such as polyethylene, etc. Each individual traction strip may then be removed as described below in connection with FIGS. 2, 3 and 4.

Although as described above it may be desirable to manufacture the strips in a multiple assembly, they can be made individually by assembling precut strips of fabric and backing and packaging them separately; however, for convenience in handling and removing of the adhesive coated units it may be preferable to provide a plurality of segments supported upon a single bonding sheet as described.

As shown in FIGS. 3 and 4, when the traction strip is ready to be applied to the desired area of the eyeglasses, one segment is lifted from the base backing sheet 27 by grasping the uncovered tab end 15 and tab end 16, together with the portion of the traction strip adherent to it, and lifting segment 11 by pulling its front portion 11a from adherence to area 28 of base sheet 27. At the same time, the remainder of the assembly, consisting of the rear portion 11b of segment 11, adhered to the upper tab, 15, of the folded over V-shaped segment and the corresponding section of base portion 16 are lifted upward away from the base sheet. While so grasped, the segment 11a may then be applied and pressed to the desired area of the eyeglasses where it will be retained by the adhesive. In order to cause adherence of the rear portion of segment 12, the uncovered lower tab portion of the folded over V-shaped segment, 16, which extends beyond the upper portion, 15, is grasped and peeled away from the remaining adhesive coated portion of strip 11 as shown by the arrow in FIG. 3 and then pressing it against the selected nose or ear piece section of the eyeglasses. As referred to above, the strips which are provided with parallel longitudinal filaments are applied in such a manner that these filaments run transversely or angularly to the direction of slippage as illustrated in FIG. 1.

The traction strips described herein, which are comprised of strips of fibrous material coated on one side with a pressure sensitive adhesive, are found to provide added resistance to slippage, as described above, at least partially because body warmth appears to cause migration of the adhesive to the exposed surface of the strip which is in contract with the body of the wearer which provides a tacky contact area. In addition, when the transverse filaments are incorporated in the strips, additional resistance to slippage is provided.

The individual traction strips are cut to any desired size depending upon the type of glasses which they are to be applied. In general, the strips may be about ⅛ inch (0.3 cm) to ¼ inch (0.6 cm) in width and ½ inch(1.25 cm) to ¾ inch (1.875 cm) length. The folded over protective members would be of equal width and long enough to provide tab ends for grasping as described, for example, extending beyond the strips about ¼ to ½ inch.

The adhesive utilized may be of any conventional type of pressure sensitive adhesive as well known to the prior art; however, it is preferable to select a non-toxic non-irritating adhesive utilizing solvents or disperants such as water, alcohol, hydrocarbons, etc. such as described for example, in U.S. Pat. No. 4,251,302 referred to above.

The filaments utilized to provide added resistance to slippage may be formed of extruded polypropylene or nylon filaments or of threads formed of groups of fibers having a suitable diameter ranging for example from 01. to 1. millimeter spaced apart about 1/32 inches (1. mm) to 1/16 inches (2. mm) apart. These are applied to the fibrous material at the surface or embedded during weaving or fabrication of the bonded non-woven fibers.

Having thus described certain embodiments of this invention, it is to be understood that the descriptions contained herein are merely illustrative and not for purposes of limitation, the scope of the invention being set forth in the appended claims.

I claim:

1. A traction strip for eyeglasses for application to the skin engaging surfaces thereof in order to minimize slippage when worn, which comprises a porous fibrous member and a coating of a pressure sensitive adhesive on one surface only thereof for adhesion of said strip to said skin engaging surfaces, said porous member comprising a mat of non-woven fibers loosely bonded together and having a plurality of spaced parallel filaments mounted upon or embedded adjacent to the uncoated surface of said strip extending transversely or angularly with respect to the longitudinal axis thereof in order to increase resistance to slippage, said porous member permitting frictional engagement between the eye-glasses and skin and allowing said pressure sensitive adhesive to penetrate to the exposed outer surface of said strip under the influence of body heat when worn to provide a tacky surface in contact with the skin and thereby additionally minimize slippage.

2. A traction strip according to claim 1 wherein the spaced parallel filaments are formed of extruded material or threads having a diameter of from about 0.1 to 1 millimeter and are spaced apart from about 1-2 millimeters.

3. A traction strip of eyeglasses for application to the skin engaging surfaces thereof in order to minimize slippage when worn, which comprises a porous fibrous member and a coating of a pressure sensitive adhesive on one surface only thereof for adhesion of said strip to said skin engaging surfaces, said porous member permitting frictional engagement between the eyeglasses and skin and allowing said pressure sensitive adhesive to penetrate to the exposed outer surface of said strip under the influence of body heat when worn to provide a tacky surface to contact with the skin and thereby additionally minimize slippage, wherein a first portion of the adhesive coated surface is superimposed upon a first releasable backing strip and the remaining second portion is superimposed upon the upper fold of a second folded releasable backing strip having edges of the upper and lower folds projecting beyond said fibrous member to provide tab ends to be engaged for removal of said fibrous member from said first backing strip and exposing said first portion of the adhesive coating for application of that portion of the traction slip to said eyeglasses and the bottom fold of said folded strip engageable at its tab end to permit the upper fold to be drawn from the remaining adhesive coated surface of the traction strip and thereby permit said second portion of the adhesive coated surface of the traction strip to be applied to said eyeglasses.

4. A plurality of traction strips according to claim 3 assembled side by side upon said first releasable backing sheet.

5. Eyeglasses having a nosepiece and/or temple members wherein the skin contacting surfaces of said nosepiece and/or temple members are provided with traction strips comprising segments of porous fibrous material affixed thereto by means of a pressure sensitive adhesive in which said adhesive is applied only to the surface of said segment in contact with said skin contacting surface, said traction strips being provided with spaced parallel filaments adjacent to the outer surface thereof and wherein said traction strips are positioned so that the said parallel filaments extend across said nosepiece and on temple members transversely to the normal directions of slippage, said porous fibrous material permitting frictional engagement between said eyeglasses and skin and allowing said pressure sensitive adhesive to penetrate to the exposed outer surface thereof under the influence of body heat to thereby provide a tacky surface in contact with the skin of the wearer to reinforce resistance to slippage when worn.

6. Eyeglasses having a nosepiece and/or temple members wherein the skin contacting surfaces thereof are provided with traction strips comprising segments of porous fibrous material having a coating of a pressure sensitive adhesive on one surface only thereof, said segments being affixed to said skin contacting surface by means of said adhesive, said porous fibrous material permitting frictional engagement between said eyeglasses and skin when worn and allowing said pressure sensitive adhesive to penetrate to the exposed outer surface thereof under the influence of body heat to thereby provide a tacky surface in contact with the skin of the wearer to reinforce resistance to slippage.

7. Eyeglasses according to claim 6 wherein the porous fibrous member comprises a mat of non-woven fibers loosely bonded together.

* * * * *